(12) United States Patent
Cui et al.

(10) Patent No.: US 12,281,194 B2
(45) Date of Patent: Apr. 22, 2025

(54) ENVIRONMENT-FRIENDLY AND FLAME-RETARDANT ABRADABLE SEAL COATING MATERIAL WITH ULTRA-LOW DENSITY AND USE METHOD THEREOF

(71) Applicant: Lanzhou Institute of Chemical Physics, Chinese Academy of Sciences, Lanzhou (CN)

(72) Inventors: Haixia Cui, Lanzhou (CN); Lei Chen, Lanzhou (CN); Yue Zhang, Lanzhou (CN); Yanping Wu, Lanzhou (CN); Hongxuan Li, Lanzhou (CN); Huidi Zhou, Lanzhou (CN); Jianmin Chen, Lanzhou (CN)

(73) Assignee: Lanzhou Institute of Chemical Physics, Chinese Academy of Sciences, Lanzhou (CN)

( * ) Notice: Subject to any disclaimer, the term of this patent is extended or adjusted under 35 U.S.C. 154(b) by 456 days.

(21) Appl. No.: 17/844,321

(22) Filed: Jun. 20, 2022

(65) Prior Publication Data
US 2023/0183417 A1 Jun. 15, 2023

(30) Foreign Application Priority Data
Dec. 15, 2021 (CN) .......................... 202111536216.6

(51) Int. Cl.
| C08G 59/40 | (2006.01) |
| C08G 59/44 | (2006.01) |
| C08K 7/28 | (2006.01) |

(52) U.S. Cl.
CPC ......... *C08G 59/4071* (2013.01); *C08G 59/44* (2013.01); *C08K 7/28* (2013.01); *C08G 2190/00* (2013.01)

(58) Field of Classification Search
CPC .......................... C08G 59/4071; C08G 59/44; C08G 2190/00; C08K 7/28; C09D 163/00
See application file for complete search history.

(56) References Cited

FOREIGN PATENT DOCUMENTS

| CN | 110628180 A | * 12/2019 | ............... C08K 7/28 |
| CN | 113025247 A | * 6/2021 | |
| CN | 113773726 A | * 12/2021 | ........... B32B 15/082 |
| TW | 1678390 B1 | * 12/2019 | ............. B32B 15/14 |
| WO | WO-2021250595 A1 | * 12/2021 | ........... B32B 15/082 |

OTHER PUBLICATIONS

CN110628180A Machine Translation (Year: 2019).*
CN113025247A Machine Translation (Year: 2021).*
TWI678390B1 Machine Translation (Year: 2019).*

* cited by examiner

*Primary Examiner* — Megan McCulley
*Assistant Examiner* — Caitlin Norine Illing
(74) *Attorney, Agent, or Firm* — Nields, Lemack & Frame, LLC

(57) ABSTRACT

Disclosed is an environment-friendly and flame-retardant abradable seal coating material with an ultra-low density and a use method thereof. The seal coating material includes a component A and a component B packaged separately; the component A includes 20-30 wt % of a curing agent for bisphenol A epoxy resin, 20-30 wt % of a liquid phosphorus-containing curing agent, 20-40 wt % of a hollow glass microbead, 1-5 wt % of 2,4,6-tris(dimethylaminomethyl) phenol, 5-15 wt % of dimethyl methylphosphonate and 0.5-3 wt % of a silane coupling agent; the component B includes 30-40 wt % of a bisphenol A epoxy resin, 30-40 wt % of a liquid phosphorus-containing epoxy resin, 20-30 wt % of a hollow glass microbead, 0-10 wt % of a liquid acrylonitrile-butadiene rubber and 0.5-3 wt % of a silane coupling agent. The method includes: mixing the component A and the component B to obtain a coating, and applying the obtained coating to a surface of a part for curing.

15 Claims, No Drawings

ENVIRONMENT-FRIENDLY AND FLAME-RETARDANT ABRADABLE SEAL COATING MATERIAL WITH ULTRA-LOW DENSITY AND USE METHOD THEREOF

CROSS REFERENCE TO RELATED APPLICATION

This patent application claims the benefit and priority of Chinese Patent Application No. 202111536216.6, entitled "Environment-friendly and flame-retardant abradable seal coating material with ultra-low density and use method thereof" filed on Dec. 15, 2021, the disclosure of which is incorporated by reference herein in its entirety as part of the present application.

TECHNICAL FIELD

The present disclosure relates to the technical field of composite materials, and in particular to an environment-friendly and flame-retardant abradable seal coating material with an ultra-low density and a use method thereof.

BACKGROUND ART

In order to ensure the operational efficiency of an aero-engine, an abradable seal coating shall be applied to the fan casing in the low-temperature section of the engine. On one hand, the sealing performance of gas path is improved, and the loss in compressed airflow is reduced. On the other hand, the fan blades rotating at a high speed are protected to reduce damage. Besides, the machining problems brought about by the roundness of the casing may be relieved. With the rapid development in aviation industry, high thrust, high thrust-to-weight ratio, high efficiency and low fuel consumption have become an overall goal in design and manufacturing of engines. Therefore, higher requirements for high performance, light weighting and flame retardancy have been placed on the abradable seal coating of the fan casing correspondingly.

In Russia, an abradable coating filled with talc powders has been developed by blending an epoxy resin with talc powders. The material has excellent abradability and is moreover easy for construction and maintenance, but it has a relatively high density of 1.7 g/cm$^3$. According to Momentive Company, an abradable coating material is formed by blending a silicone rubber RTV147 or RTV630 with hollow glass beads. The material has excellent abradability and also a density of 0.8 g/cm$^3$. However, the condition during use is harsh and the process is cumbersome, resulting in difficulty in quality control of coatings. According to 3M Company, a light-weight abradable coating EC3524 is developed by blending an epoxy resin with certain flame retardancy and hollow glass beads. The material has excellent performances, is convenient for construction and maintenance, and has a density of only 0.5 g/cm$^3$. However, the flame retardant as used in the material includes a bromine-containing epoxy resin and diantimony trioxide, which produces a mass of flue gases and toxic corrosive gases as burning and results in environmental problems.

SUMMARY

An objective of the present disclosure is to provide an environment-friendly and flame-retardant abradable seal coating material with an ultra-low density and a use method thereof. The abradable seal coating material as provided in the present disclosure has an ultra-low density and appropriate mechanical strength and great flame retardancy.

In order to achieve the objective above, the present disclosure provides the following technical solutions:

The present disclosure provides an environment-friendly and flame-retardant abradable seal coating material with an ultra-low density, including a component A and a component B packaged separately, in which the component A includes 20-30 wt % of a curing agent for bisphenol A epoxy resin, 20-30 wt % of a liquid phosphorus-containing curing agent, 20-40 wt % of a hollow glass microbead, 1-5 wt % of 2,4,6-tris(dimethylaminomethyl)phenol, 5-15 wt % of dimethyl methylphosphonate and 0.5-3 wt % of a silane coupling agent;

the component B includes 30-40 wt % of a bisphenol A epoxy resin, 30-40 wt % of a liquid phosphorus-containing epoxy resin, 20-30 wt % of a hollow glass microbead, 0-10 wt % of a liquid acrylonitrile-butadiene rubber and 0.5-3 wt % of a silane coupling agent.

In some embodiments, the silane coupling agents in the component A and the component B are independently KH-550, KH-560 or KH-590.

In some embodiments, the bisphenol A epoxy resin has an epoxy value of 0.44-0.54.

In some embodiments, the liquid phosphorus-containing epoxy resin has a phosphorus content of 2-4 wt %, a density of 1.05-1.12 g/cm$^3$ and an epoxy value of 1.20-1.22.

In some embodiments, the hollow glass microbeads in the component A and the component B each have a particle size D90 of 70 μm, a true density of 0.21-0.24 g/cm$^3$ and a bulk density of 0.11-0.13 g/cm$^3$.

In some embodiments, the curing agent for bisphenol A epoxy resin includes at least one selected from the group consisting of a phenalkamide curing agent, a phenalkamine curing agent and a polyamide curing agent; the phenalkamide curing agent has a viscosity of 4,000-6,000 cPs at 25° C. and an amine value of 360-400 mg KOH/g.

In some embodiments, the liquid acrylonitrile-butadiene rubber has an acrylonitrile content of 40 wt %; the liquid phosphorus-containing curing agent has a phosphorus content of 2-4 wt %, a density of 1.05-1.10 g/cm$^3$ and an amine value of 340-350 KOH/g.

The present disclosure further provides a method for using the environment-friendly and flame-retardant abradable seal coating material with an ultra-low density according to the above solutions, including: mixing the component A and the component B to obtain a coating, and then applying the coating obtained to a surface of a part for curing.

In some embodiments, a mass ratio of the component A to the component B is in a range of 1: (1-1.5).

In some embodiments, the applying is conducted within 2 h.

The present disclosure provides an environment-friendly and flame-retardant abradable seal coating material with an ultra-low density, including a component A and a component B which are separately packaged; the component A includes 20-30 wt % of a curing agent for bisphenol A epoxy resin, 20-30 wt % of a liquid phosphorus-containing curing agent, 20-40 wt % of a hollow glass microbead, 1-5 wt % of 2,4,6-tris(dimethylaminomethyl)phenol, 5-15 wt % of dimethyl methylphosphonate and 0.5-3 wt % of a silane coupling agent; the component B includes 30-40 wt % of a bisphenol A epoxy resin, 30-40 wt % of a liquid phosphorus-containing epoxy resin, 20-30 wt % of a hollow glass microbead, 0-10 wt % of a liquid acrylonitrile-butadiene rubber and 0.5-3 wt % of a silane coupling agent.

In the present disclosure, the bisphenol A epoxy resin and liquid phosphorus-containing epoxy resin are used as a base material, which has strong adhesion to a substrate. In addition, the liquid phosphorus-containing epoxy resin also has the advantages such as good flame retardancy, high thermal stability, little influence on properties of a cured product, less smoke, low toxicity and low heat release. In the present disclosure, the liquid phosphorus-containing epoxy resin is chosen to be used in combination with the bisphenol A epoxy resin, so that the flame retardancy of the abradable coating is increased, the mechanical property of the coating is improved, and environmental protection and low toxicity are also achieved. In the present disclosure, the hollow glass microbeads are used as the filler, which have the advantages of light weight, large volume, low thermal conductivity coefficient, high compressive strength and good dispersibility, fluidity and stability, and thus may meet the requirements for such as light weight, appropriate strength, abradability, fluid resistance and flame retardancy of the coating materials. At the same time, the hollow glass microbeads also have the advantages such as good lubricity and dispersibility, free of toxicity, excellent in-process operability and easy addition. In the present disclosure, the liquid phosphorus-containing curing agent used is suitable for curing of liquid phosphorus-containing epoxy resin, and meanwhile may improve the flame retardancy of the coating materials.

The abradable seal coating material according to the present disclosure breaks through the bottleneck that the density, strength and abradability of the existing seal coatings are difficult to be balanced. The coating material has a proper viscosity and is convenient for construction.

The coating is uniform, continuous and free of falling off in chunks under machining. After the machining, the coating is smooth and delicate on the surface, and has appropriate mechanical strength and excellent aging resistance, abradability, water resistance and flame retardancy. The most important thing is that the coating has an ultra-low density and a small weight, thus meeting the requirements for light weighting and low fuel consumption of engines. The coating material may be used in the gaps among the compressor, the turbine blade tip and the casing, for filling or controlling the gaps and sealing edges, thereby reducing loss in compressed airflow, improving significantly the engine efficiency and reducing the fuel consumption. The seal coating material according to the present disclosure has good adhesion to the substrates of metals and composite materials. The coating is free of such as generating cracks and falling off in chunks under the impact of a high-speed airflow. Upon frictional contact with a blade tip rotating at a high speed, the seal coating is readily scraped without damaging the blade tip.

DETAILED DESCRIPTION OF THE EMBODIMENTS

The present disclosure provides an environment-friendly and flame-retardant abradable seal coating material with an ultra-low density, including a component A and a component B that are separately packaged; the component A includes 20-30 wt % of a curing agent for bisphenol A epoxy resin, 20-30 wt % of a liquid phosphorus-containing curing agent, 20-40 wt % of a hollow glass microbead, 1-5 wt % of 2,4,6-tris(dimethylaminomethyl)phenol, 5-15 wt % of dimethyl methylphosphonate and 0.5-3 wt % of a silane coupling agent; the component B includes 30-40 wt % of a bisphenol A epoxy resin, 30-40 wt % of a liquid phosphorus-containing epoxy resin, 20-30 wt % of a hollow glass microbead, 0-10 wt % of a liquid acrylonitrile-butadiene rubber and 0.5-3 wt % of a silane coupling agent.

In the present disclosure, unless otherwise specified, all components are commercially available products well known in the art.

Next, the component B will be described below.

According to the present disclosure, the component B, as a whole, includes 30-40 wt % of a bisphenol A epoxy resin, 30-40 wt % of a liquid phosphorus-containing epoxy resin, 20-30 wt % of a hollow glass microbead, 0-10 wt % of a liquid acrylonitrile-butadiene rubber and 0.5-3 wt % of a silane coupling agent.

In the present disclosure, the component B includes 30-40 wt % of the bisphenol A epoxy resin, preferably 32-38 wt %, and more preferably 34-36 wt %. In the present disclosure, in some embodiments, the bisphenol A epoxy resin has an epoxy value of 0.44-0.54.

In the present disclosure, the component B includes 30-40 wt % of the liquid phosphorus-containing epoxy resin, preferably 32-38 wt %, and more preferably 34-36 wt %. In the present disclosure, in some embodiments, the liquid phosphorus-containing epoxy resin has a phosphorus content of 2-4 wt %, a density of 1.05-1.12 g/cm$^3$ and an epoxy value of 1.20-1.22.

In the present disclosure, the bisphenol A epoxy resin and liquid phosphorus-containing epoxy resin are used as base materials, both of which contain polar groups such as an aliphatic hydroxyl group, an ether group and an epoxy group. Due to the polarity of the hydroxyl and the ether groups, electromagnetic or chemical attraction is generated between the molecules of the epoxy resins and the surface to be applied. Also, the epoxy groups react with a metallic surface containing the reactive hydrogen to generate chemical bonds. Therefore, these epoxy resins have strong adhesion to various materials, especially metallic materials. In addition, the bisphenol A epoxy resin and the liquid phosphorus-containing epoxy resin are both liquids. The liquid epoxy resins allow preparation of a solvent-free coating with high cohesive strength and low shrinkage rate, and modification by adding fillers. Moreover, there are many kinds of curing agents for the epoxy resins. With different curing agents, the products vary in property correspondingly. Thus, it is convenient to select an appropriate curing agent according to a specific use background.

In the present disclosure, the bisphenol A epoxy resin has an epoxy value of 0.44-0.54, is in the form of liquid, and has appropriate viscosity, softening point and melting point as well as excellent in-process operability and usability. Nevertheless, as a general-purpose epoxy resin, the bisphenol A epoxy resin is quite easy to burn and has a limiting oxygen index of only 19.8. In the present disclosure, the liquid phosphorus-containing epoxy resin is used in combination, which realizes not only good flame retardancy, high thermal stability and little influence on properties of cured product, but also less smoke, low toxicity and low heat release. In the present disclosure, the liquid phosphorus-containing epoxy resin is used in combination with the bisphenol A epoxy resin, so that the flame retardancy of an abradable coating may be increased and the mechanical property of the coating may be improved.

In the present disclosure, the component B includes 20-30 wt % of a hollow glass microbead, preferably 22-28 wt %, and more preferably 24-26 wt %. In the present disclosure, in some embodiments, the hollow glass microbead has a particle size D90 of 70 μm, a true density of 0.21-0.24 g/cm$^3$, a bulk density of 0.11-0.13 g/cm$^3$ and a compressive strength of 8 MPa. In the present disclosure, the hollow glass microbead is used as the filler with borosilicate as the main ingredient, which has advantages of light weight, large volume, low thermal conductivity coefficient, high compressive strength and good dispersibility, fluidity and stability. In addition, the hollow glass microbead has excellent properties such as electrical insulation, self-lubrication, sound insulation, water resistance, fire resistance, corrosion resistance, radiation protection and non-toxicity. In the present disclosure, the hollow glass microbead used has a particle size D90 of 70 µm, a true density of 0.21-0.24 g/cm$^3$ and a compressive strength of 8 MPa, which meets the requirements for light weight, appropriate strength, abradability, fluid resistance and flame retardancy of the coating materials, and meanwhile has the advantages of desirable lubricity and dispersibility, free of toxicity, excellent in-process operability and easy addition.

In the present disclosure, the component B includes 0-10 wt % of the liquid acrylonitrile-butadiene rubber, preferably 1-9 wt %, and more preferably 2-8 wt %. In the present disclosure, in some embodiments, the liquid acrylonitrile-butadiene rubber has an acrylonitrile content of 40 wt %. In the present disclosure, the liquid acrylonitrile-butadiene rubber is used as a toughener that may react with the epoxy resins. By introducing the tough segments of the rubber into a cross-linked structure of the epoxy resins, the modified epoxy resin cured product is improved in toughness, impact resistance and peel resistance.

In the present disclosure, the component B includes 0.5-3 wt % of a silane coupling agent, preferably 1.0-2.5 wt %, and more preferably 1.5-2.0 wt %. In the present disclosure, in some embodiments, the silane coupling agent is KH-550, KH-560 or KH-590. In the present disclosure, the silane coupling agent in the component B plays a role in improving the dispersibility of the hollow glass microbeads in the resin system, so that the resin encapsulates the surface of each microbead evenly to form an uniform and continuous structure. The hollow glass microbead has silicon dioxide as the main ingredient, and has a large number of silicon hydroxyl groups on the surface. The trifunctional siloxy groups of the silane coupling agent are hydrolyzed to generate silanol, and then subjected to a condensation reaction with the silicon hydroxyl groups on surface of the glass microbeads to form chemical bonds. KH-550 and KH-560 may connect respectively amino groups and epoxy groups to surface of the hollow glass microbeads and participate in the whole curing reaction process, so as to make the hollow glass microbeads organically bonded to the epoxy matrix. The organic long bonds of KH-590 grafted to the surface of the hollow glass microbeads may be dissolved and diffused into the resin at the interface area to entangle with the macromolecular chains of the resin, so as to increase the bonding force between the hollow glass microbeads and the resin matrix at the interface.

In the present disclosure, the preparation process of the component B is not specially limited, and the respective components may be directly mixed uniformly.

Next, the component A will be described below.

In the present disclosure, the component A, as a whole, includes 20-30 wt % of a curing agent for bisphenol A epoxy resin, 20-30 wt % of a liquid phosphorus-containing curing agent, 20-40 wt % of a hollow glass microbead, 1-5 wt % of 2,4,6-tris(dimethylaminomethyl)phenol, 5-15 wt % of dimethyl methylphosphonate and 0.5-3 wt % of a silane coupling agent.

In the present disclosure, the component A includes 20-30 wt % of the curing agent for bisphenol A epoxy resin, preferably 22-28 wt %, and more preferably 24-26 wt %. In the present disclosure, the curing agent for bisphenol A epoxy resin preferably includes at least one selected from the group consisting of a phenalkamide curing agent, a phenalkamine curing agent and a polyamide curing agent, and more preferably the phenalkamide curing agent. According to the present disclosure, when a phenalkamide curing agent is used, the phenalkamide curing agent preferably has a viscosity of 4,000-6,000 cPs at 25° C. and an amine value of 360-400 mg KOH/g. In the present disclosure, the phenalkamide curing agent is free of solvents, has the advantages of both the polyamide curing agent and phenalkamine curing agent, and is suitable for the coatings having a high proportion of solids, especially the solvent-free coating according to the present disclosure. The coating thus obtained has excellent water resistance, adhesion, toughness, impact resistance and corrosion resistance, and moreover has a relatively long operating period at room temperature and excellent recoatability, facilitating the construction.

In the present disclosure, the component A includes 20-30 wt % of the liquid phosphorus-containing curing agent, preferably 22-28 wt %, and more preferably 24-26 wt %. In the present disclosure, in some embodiments, the liquid phosphorus-containing curing agent has a phosphorus content of 2-4 wt %, a density of 1.05-1.10 g/cm$^3$ and an amine value of 340-350 KOH/g. In the present disclosure, the liquid phosphorus-containing curing agent is applicable to the curing of the liquid phosphorus-containing epoxy resin, and meanwhile may improve the flame retardancy of the coating material.

In the present disclosure, the component A includes 20-40 wt % of a hollow glass microbead, preferably 25-35 wt %. In the present disclosure, the hollow glass microsphere in the component A has the same specification and function as those of the hollow glass microbead in the component B.

In the present disclosure, the component A includes 1-5 wt % of 2,4,6-tris(dimethyl-aminomethyl)phenol, and preferably 2-4 wt %. In the present disclosure, in some embodiments, 2,4,6-tris(dimethylaminomethyl)phenol is analytically pure. In the present disclosure, 2,4,6-tris(dimethylaminomethyl)phenol is used as a curing accelerator, promoting complete curing of the epoxy resins and improving the bonding strength.

In the present disclosure, the component A includes 5-15 wt % of dimethyl methyl-phosphonate, preferably 7-13 wt %, and more preferably 9-11 wt %. In the present disclosure, in some embodiments, dimethyl methylphosphonate is analytically pure. In the present disclosure, dimethyl methylphosphonate is used as an internally added flame retardant. The most significant characteristic of dimethyl methylphosphonate is that it has a phosphorus content of up to 25%, and thus has a considerably high flame retardant efficiency, achieving the same effect with an amount only half or even less of that of a commonly used flame retardant. Due to the low adding amount, the influence on the physical and chemical properties of synthetic material is reduced to a very low extent. The product added with dimethyl methylphosphonate has self-extinguishing, low-temperature resistance, plasticity, ultraviolet stability and antistatic property totally superior to those added with other flame retardants. In addition, dimethyl methylphosphonate has only a density of 1.16 g/cm$^3$, which is lower than that of other common flame retardants, meeting the requirements for weight reduction of an engine.

In the present disclosure, the component A includes 0.5-3 wt % of a silane coupling agent, preferably 1.0-2.5 wt %, and more preferably 1.5-2.0 wt %. In the present disclosure, in some embodiments, the silane coupling agent is KH-550, KH-560 or KH-590. In the present disclosure, the silane coupling agent in the component A plays a role in improving the dispersibility of the hollow glass microbeads in the resin system, so that the resin encapsulates the surface of each microbead evenly to form an uniform and continuous structure.

In the present disclosure, the preparation process of the component A is not specially limited, and the respective components may be directly mixed uniformly.

The present disclosure further provides a method for using the environment-friendly and flame-retardant abradable seal coating material with an ultra-low density according to the above solutions, including: mixing the component A and the component B to obtain a coating, and then applying the obtained coating to a surface of a part for curing.

In the present disclosure, in some embodiments, a mass ratio of the component A to the component B is in a range of 1: (1-1.5). In the present disclosure, the process of the mixing is not specially limited, as long as the coating obtained after mixing the component A and component B is consistent in color and uniform in ingredient.

Before applying, in some embodiments, a surface to be applied is cleaned. In the present disclosure, in some embodiments, the surface to be applied is cleaned by washing with ultrasonic wave or wiping with a non-woven dipped with a solvent. After drying, a better applying bonding effect is achieved.

In the present disclosure, a method for applying is not specially limited, and the applying methods well known in the art may be used. Specifically, the applying method may be conducted by, for example, applying with a scraper or a spatula, or operating directly wearing nitrile gloves. Compared with other abradable coatings, the coating according to the present disclosure has an appropriate viscosity and better operability.

In the present disclosure, the thickness of the applying is not specially limited, and those skilled in the art may select an appropriate applying thickness according to actual needs.

In the present disclosure, in some embodiments, the coating is applied within 2 h.

In the present disclosure, the type of the part is not specially limited. Specifically, the part may be a fan casing in a low-temperature section of an engine. In the present disclosure, the curing is conducted at room temperature for at least 7 days; alternatively, the curing is conducted at room temperature for 1 day, and then conducted at 60° C. for 8 h or at 121° C. for 1 h.

The environment-friendly and flame-retardant abradable seal coating material with an ultra-low density and the use method thereof provided in the present disclosure will be described in detail below with reference to examples. However, these examples should not be construed as limiting the protection scope of the present disclosure.

In the following examples, the liquid phosphorus-containing curing agent has a phosphorus content of 3 wt %, a density of 1.08 g/cm$^3$ and an amine value of 341 KOH/g; the liquid phosphorus-containing epoxy resin has a phosphorus content of 3 wt %, a density of 1.11 g/cm$^3$ and an epoxy value of 1.21; the hollow glass microbead has a particle size D90 of 70 μm and a true density of 0.23 g/cm$^3$; the bisphenol A epoxy resin has an epoxy value of 0.52; and the phenalkamide has a viscosity of 5,419 cPs at 25° C. and an amine value of 375 mg KOH/g.

EXAMPLE 1

The raw materials were as follows. Component A: 50 g of the hollow glass microbead, 40 g of phenalkamide, 30 g of the liquid phosphorus-containing curing agent, 5 g of 2,4,6-tris (dimethylaminomethyl)phenol, 10 g of dimethyl methylphosphonate and 2 g of silane coupling agent KH-550;

Component B: 55 g of the hollow glass microbead, 80 g of the bisphenol A epoxy resin, 65 g of the liquid phosphorus-containing epoxy resin and 2 g of silane coupling agent KH-550.

EXAMPLE 2

The raw materials were as follows. Component A: 48 g of the hollow glass microbead, 35 g of phenalkamide, 35 g of the liquid phosphorus-containing curing agent, 5 g of 2,4,6-tris (dimethylaminomethyl)phenol, 20 g of dimethyl methylphosphonate and 2 g of silane coupling agent KH-560;

Component B: 52 g of the hollow glass microbead, 70 g of the bisphenol A epoxy resin, 70 g of the liquid phosphorus-containing epoxy resin and 2 g of silane coupling agent KH-560.

EXAMPLE 3

The raw materials were as follows. Component A: 48 g of the hollow glass microbead, 38 g of phenalkamide, 30 g of the liquid phosphorus-containing curing agent, 5 g of 2,4,6-tris (dimethylaminomethyl)phenol, 20 g of dimethyl methylphosphonate and 2 g of silane coupling agent KH-560;

Component B: 52 g of the hollow glass microbead, 70 g of the bisphenol A epoxy resin, 60 g of the liquid phosphorus-containing epoxy resin, 5 g of liquid acrylonitrile-butadiene rubber and 2 g of silane coupling agent KH-560.

Performance tests:

The raw materials of the component A and the component B were weighed according to the weights above and uniformly mixed, respectively. Then the component A and the component B were mixed and stirred until the color was consistent, obtaining a coating for later use. During actual use, the coating was uniformly applied to a surface of a part with a scraper, and applying was completed within 2 h. For performance tests, the testing samples were prepared according to the specified test standards, and were then subjected to, after complete curing, testing according to corresponding standards.

Performance indicators and test standards were as follows:

1. Appearance of coating: Both component A and component B were putty-like filling glues, which were uniform and free of foreign impurities.
2. Appearance and processing performance of coating: uniform, continuous and free of falling off in chunks during machining.
3. Density of coating: the density after curing was in a range of 0.38-0.41 g/cm$^3$, and the test was performed with an automatic density tester.
4. Shore D hardness: the Shore D hardness was in a range of 45-60, and the test was performed with a Shore durometer.
5. Bending strength: the bending strength was in a range of 15-30 MPa, and the test was performed with a universal material testing machine under ASTM D790.
6. Shear strength: the shear strength was in a range of 5-10 MPa, and the test was performed as a single-lap-joint test on aluminum alloy testing pieces with a universal material testing machine under ASTM D1002.
7. Compressive strength: the compressive strength was in a range of 15-50 MPa, and the test was performed with a universal material testing machine under ASTM D695.

8. Dynamic mechanical analysis (DMA): the glass transition temperature (Tg) was in a range of 50° C.-80° C., and the test was performed with a thermomechanical analyzer DMA242E under ASTM D7028.
9. Temperature-time aging test: the samples were placed at room temperature for 100 h, at 121° C. for 100 h (with hot air) and at 149° C. for 100 h (with hot air) for aging test, respectively, and the compressive strength after aging was measured with a universal material testing machine under ASTM D695. Specific test conditions and indicators were shown in Table 1.

TABLE 1

Aging performance of the coating according to the present disclosure

| Temperature and time for aging | Test temperature | Compressive strength |
|---|---|---|
| Room temperature, 100 h | Room temperature | 23-24 MPa |
| 121° C., 100 h | Room temperature | 27-29 MPa |
|  | 121° C. | 5-7 MPa |
| 149° C., 100 h | Room temperature | 28-29 MPa |
|  | 149° C. | 1.5-3.5 MPa |

10. Flame retardancy: the test was performed by the 60 seconds vertical burning method (afterflame time ≤5 seconds, scorch length ≤152 mm, droplet flame burning time <3 seconds) with a vertical burner under the test standard of FAR25 (Federal Aviation Regulations, Part 25: Airworthiness Standards for Transport Category Airplanes, Appendix F14).
11. Fluid resistance: a sample with a size of 12.7 mm×12.7 mm×12.7 mm was cut from cured material, soaked in a test liquid at room temperature for 24-25 h, and then taken out, wiped and weighed. The percentage of weight increasing was calculated. The test liquid included the following four types: deionized water, flame-retardant hydraulic oil, petroleum-based hydraulic oil and a B-type test liquid in accordance with ASTM D471. The indicator requirements were as follows: the percentage of weight increasing in the deionized water≤4.1%; in the flame-retardant hydraulic oil≤8.0%; in the petroleum-based hydraulic oil≤4.2%; in the B-type test liquid≤3.0%.
12. Abradability: the test was performed with a high-temperature and ultra-high-speed abradability testing device at a tangential velocity of 402 m/s, a feed rate of 50 um/s and a feed depth of 5,000 um. A desirable abradability was indicated provided that the coating was free of falling off in chunks, the abrasive dusts were fine, uniform and powdery, and the height wear ratio of blade was less than 10%.

Detailed results of the performance tests in the examples above were shown in Table 2.

TABLE 2

Results of performance tests of coatings according to Examples 1-3

| No. | Test item | | Technical indicator | Example 1 | Example 2 | Example 3 |
|---|---|---|---|---|---|---|
| 1 | Density, g/cm$^3$ | | ≤0.5 | 0.38 | 0.40 | 0.40 |
| 2 | Gelation time, min | | ≥50 | 150 | 150 | 150 |
| 3 | Compressive strength, 25 ± 3° C., MPa | | ≥13.8 | 19 | 22 | 23 |
| 4 | Lap-joint shear strength, 25 ± 3° C., MPa | | ≥5.17 | 5.98 | 6.95 | 6.14 |
| 5 | 60 s Vertical burning | | | | | |
|  | (a) Flame burning time, s | | ≤5 | 38 | 0 s | 0 s |
|  | (b) Scorch length, mm | | ≤152 | 305 | 137 mm | 147 mm |
|  | (c) Droplet flame burning time, s | | ≤3 | 21 | No droplet | No droplet |
| 6 | Fluid resistance, % | Distilled water | ≤4.1 | 0.98 | 0.96 | 0.93 |
|  |  | Flame-retardant hydraulic oil | ≤8.0 | 1.68 | 1.51 | 1.64 |
|  |  | Petroleum-based hydraulic oil | ≤4.2 | 1.82 | 1.78 | 1.78 |
|  |  | ASTM D471, B-type test liquid | ≤3.0 | 2.75 | 2.38 | 2.36 |
| 7 | Shore D hardness | | — | 48 | 50 | 50 |
| 8 | Glass transition temperature | | — | 62 | 64 | 65 |
| 9 | Bending strength, MPa | | — | 23 | 22 | 20 |
| 10 | Aging performance | Aging at room temperature for 100 h | Test at room temperature | — | 24 | 23 | 24 |
|  |  | Aging at 121° C. for 100 h | Test at room temperature | — | 28 | 29 | 27 |
|  |  |  | Test at 121° C. | — | 6.12 | 5.64 | 5.87 |
|  |  | Aging at 149° C. for 100 h | Test at room temperature | — | 28 | 28 | 29 |
|  |  |  | Test at 149° C. | — | 1.94 | 2.94 | 2.71 |
| 11 | Abradability | | Excellent | — | Excellent* | — |

*(1) Surface wear morphology: the coating scraped was uniform and smooth on surface without falling off in chunks; the blade tip was slightly worn with a smooth and uniform surface; no obvious adhering substance was observed on the blade.
(2) Wear mass: the blade had a wear ratio of 0.025%, the coating had a wear ratio of 4%, and the ratio of the wear mass of the blade to the wear mass of the coating was less than 0.15%.
(3) Blade height wear ratio (IDR): 0.7%.
(4) Abrasive dust: fine and uniform.

From the results of performance tests above, it may be seen that the coating of the present disclosure has an appropriate viscosity and is convenient for construction. The coating prepared is uniform and continuous, allowed to be cured at room temperature, free of falling off in chunks during machining, and shows a smooth and delicate surface after machining. The coating has an ultra-low density and a small weight to meet the requirements for light weighting and low fuel consumption of engines, and meanwhile has appropriate mechanical strength and excellent aging resistance, abradability, fluid resistance and flame retardancy. The coating material may be used in the gaps among the compressor, the turbine blade tip and the casing for controlling the gaps and sealing edges to effectively reduce the airflow gaps in radial direction, thereby achieving a maximum differential pressure, reducing the loss in compressed airflow and lubricating oil, and significantly improving engine efficiency and reducing fuel consumption. During the friction and scraping between the blade tip rotating at a high speed and the seal material, the seal material itself is worn and scraped, while the blade tip is not. As a result, a minimum gap under the actual operating state of engine may be obtained without damaging the blade. The seal coating has good adhesion to the substrates of metallic and composite materials, and is free of such as generating cracks and falling off in chunks under the impact of a high-speed airflow.

The contents described above are merely preferred embodiments of the present disclosure. It should be noted that for those skilled in the art, several improvements and modifications could be made without departing from the principle of the present disclosure, and these improvements and modifications shall be within the protection scope of the present disclosure.

What is claimed is:

1. An environment-friendly and flame-retardant abradable seal coating material with an ultra-low density, including a component A and a component B packaged separately, wherein
the component A includes 20-30 wt % of a curing agent for bisphenol A epoxy resin, 20-30 wt % of a liquid phosphorus-containing curing agent, 20-40 wt % of a hollow glass microbead, 1-5 wt % of 2,4,6-tris (dimethylaminomethyl) phenol, 5-15 wt % of dimethyl methylphosphonate and 0.5-3 wt % of a silane coupling agent; and
the component B includes 30-40 wt % of a bisphenol A epoxy resin, 30-40 wt % of a liquid phosphorus-containing epoxy resin, 20-30 wt % of a hollow glass microbead, 0-10 wt % of a liquid acrylonitrile-butadiene rubber and 0.5-3 wt % of a silane coupling agent;
wherein the liquid phosphorus-containing epoxy resin has a phosphorus content of 2-4 wt %, a density of 1.05-1.12 g/cm$^3$ and an epoxy value of 1.20-1.22.

2. The seal coating material according to claim 1, wherein the silane coupling agents in the component A and the component B are independently -aminopropyl trimethoxy silane, 3-glycidoxy-propyl trimethoxy silane, or 3-mercaptopropyltriethoxysilane.

3. The seal coating material according to claim 1, wherein the bisphenol A epoxy resin has an epoxy value of 0.44-0.54.

4. The seal coating material according to claim 1, wherein the hollow glass microbeads in the component A and the component B each have a particle size D90 of 70 um, a true density of 0.21-0.24 g/cm$^3$ and a bulk density of 0.11-0.13 g/cm$^3$.

5. The seal coating material according to claim 1, wherein the curing agent for bisphenol A epoxy resin includes at least one selected from the group consisting of a phenalkamide curing agent, a phenalkamine curing agent and a polyamide curing agent; and
the phenalkamide curing agent has a viscosity of 4,000-6,000 cPs at 25° C. and an amine value of 360-400 mg KOH/g.

6. The seal coating material according to claim 1, wherein the liquid acrylonitrile-butadiene rubber has an acrylonitrile content of 40 wt %; and
the liquid phosphorus-containing curing agent has a phosphorus content of 2-4 wt %, a density of 1.05-1.10 g/cm$^3$ and an amine value of 340-350 mg KOH/g.

7. A method for using the environment-friendly and flame-retardant abradable seal coating material with an ultra-low density according to claim 1, including: mixing the component A and the component B to obtain a coating, and then applying the obtained coating to a surface of a part for curing.

8. The method according to claim 7, wherein a mass ratio of the component A to the component B is in a range of 1:(1-1.5).

9. The method according to claim 7, wherein the applying is conducted within 2 h.

10. The method according to claim 7, wherein the silane coupling agents in the component A and the component B are independently γ-aminopropyl trimethoxy silane, 3-glycidoxy-propyl trimethoxy silane, or 3-mercaptopropyltriethoxysilane.

11. The method according to claim 7, wherein the bisphenol A epoxy resin has an epoxy value of 0.44-0.54.

12. The method according to claim 7, wherein the hollow glass microbeads in the component A and the component B each have a particle size D90 of 70 μm, a true density of 0.21-0.24 g/cm$^3$ and a bulk density of 0.11-0.13 g/cm$^3$.

13. The method according to claim 7, wherein the curing agent for bisphenol A epoxy resin includes at least one selected from the group consisting of a phenalkamide curing agent, a phenalkamine curing agent and a polyamide curing agent; and
the phenalkamide curing agent has a viscosity of 4,000-6,000 cPs at 25° C. and an amine value of 360-400 mg KOH/g.

14. The method according to claim 7, wherein the liquid acrylonitrile-butadiene rubber has an acrylonitrile content of 40 wt %; and
the liquid phosphorus-containing curing agent has a phosphorus content of 2-4 wt %, a density of 1.05-1.10 g/cm$^3$ and an amine value of 340-350 mg KOH/g.

15. An environment-friendly and flame-retardant abradable seal coating material with an ultra-low density, including a component A and a component B packaged separately, wherein
the component A includes 20-30 wt % of a curing agent for bisphenol A epoxy resin, 20-30 wt % of a liquid phosphorus-containing curing agent, 20-40 wt % of a hollow glass microbead, 1-5 wt % of 2,4,6-tris (dimethylaminomethyl) phenol, 5-15 wt % of dimethyl methylphosphonate and 0.5-3 wt % of a silane coupling agent; and
the component B includes 30-40 wt % of a bisphenol A epoxy resin, 30-40 wt % of a liquid phosphorus-containing epoxy resin, 20-30 wt % of a hollow glass microbead, 0-10 wt % of a liquid acrylonitrile-butadiene rubber and 0.5-3 wt % of a silane coupling agent;

wherein the liquid acrylonitrile-butadiene rubber has an acrylonitrile content of 40 wt %;

the liquid phosphorus-containing curing agent has a phosphorus content of 2-4 wt %, a density of 1.05-1.10 g/cm$^3$ and an amine value of 340-350 mg KOH/g.

* * * * *